Jan. 29, 1946. R. B. ROBECK 2,393,655
BARRICADE TRAVERSING DEVICE FOR MOTOR VEHICLES
Filed March 20, 1944
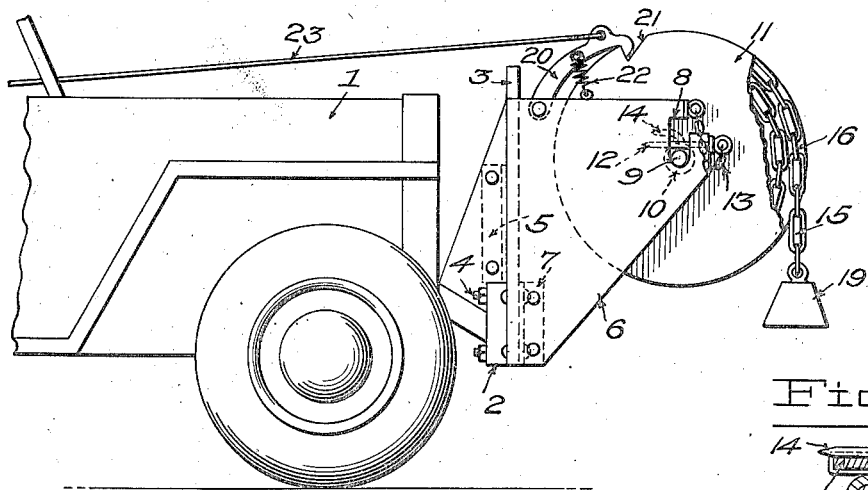
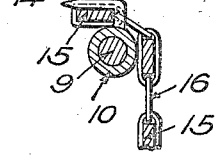
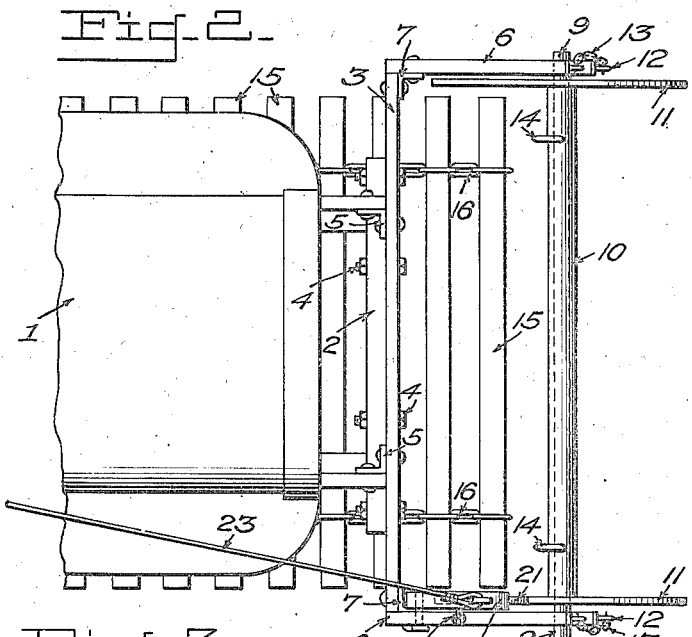
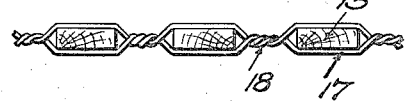
Inventor
ROBERT B. ROBECK,
By C. E. Kerrstrom & H. E. Thibodeau
Attorneys Patented Jan. 29, 1946

2,393,655

UNITED STATES PATENT OFFICE 2,393,655

BARRICADE TRAVERSING DEVICE FOR MOTOR VEHICLES

Robert B. Robeck, Everett, Wash.

Application March 20, 1944, Serial No. 527,320

1 Claim. (Cl. 280—150)

(Granted under the act of March 3, 1883, as amended April 30, 1928; 370 O. G. 757)

The invention described herein may be manufactured and used by or for the Government for governmental purposes, without the payment to me of any royalty thereon.

The object of the present invention is an accessory permitting a vehicle to pass through military barricades such as barbed wire obstructions. The practice hitherto adopted consists generally of cutting, removing or destroying the obstruction. According to this invention, however, the vehicle carries a rolled track which it lays upon the barricade and on which it travels while crossing the obstruction.

The track, in order to be rolled, may consist of a series of spaced slats joined by wire or chain. It is rolled, preferably, on a drum mounted at the front end of the vehicle, and may be weighted to unroll automatically when the drum is released. At the proper time the track is unwound in front of the vehicle and laid upon the obstruction as set forth above.

An illustrative embodiment of the invention is disclosed in the following description and in the accompanying drawing in which:

Figure 1 is a side elevation of the front end of a motor vehicle equipped with the invention;

Figure 2 is a plan view thereof, showing the track unwound;

Figure 3 is a detail longitudinal section of a modified flexible track, and

Figure 4 is a detail section.

The invention will now be described in connection with the drawing in which like reference numerals are employed to designate corresponding parts throughout.

The front end 1 of the motor vehicle carries a bumper 2 in any approved manner. The bar conveniently serves as a support for the drum on which the flexible track is rolled. For this purpose a vertical plate 3 is fastened to the bumper by bolts 4 and angle irons 5. Side plates 6 are fastened to the vertical edges of the plate 3 by suitable means such as angle irons 7. The forward ends of the plate 6 are slotted at 8 to receive the drum consisting of a shaft 9 carrying a sleeve 10 and end disks 11. The drum may be held in place by a pair of pins 12 inserted across the slots and chained at 13 to the plates 6. The sleeve 10 carries a pair of hooks 14 for a purpose that will presently be described.

The track carried by the drum or roller is a flexible construction and may consist, for example, of a series of parallel and equidistant slats 15 inserted in alternate links of a chain 16. In the modification shown in Figure 3, the slats 15' are received between wire strands 17 which are twisted at 18 between successive slats. One of the end slats may be engaged in the hooks 14, after which the track is wound on the roller as shown in Figure 1. The free end of the track is preferably weighted at 19.

In order to hold the track in the wound, idle condition a pawl 20 pivoted on one of the plates 6 is engaged in a notch 21 in the adjacent disk 11 and is normally held in this position by a spring 22 joining the pawl to the plate 6. An operating rod 23 extends from the pawl to a point within convenient reach of the driver.

In the operation of the device, when a barricade is to be crossed the driver pulls the rod 23, thereby permitting the weight 19 to descend to the ground. The vehicle advances slowly, laying track in its path and progressively upon the obstruction. As illustrated in Figure 2, the track is of such width as to permit the vehicle to travel upon it. The length of the track is sufficient to cross the expected obstruction. When the track is completely unwound from the sleeve 10, it falls off the hooks 14.

Although a specific embodiment of the invention has been illustrated and described, it will be understood that various alterations in the details of construction may be made without departing from the scope of the invention as indicated by the appended claim.

What I claim is:

A barricade traversing device for a wheeled vehicle comprising, in combination, a reel disposed transversely of the forward end of said vehicle and spaced above the ground to provide adequate clearance for the front wheels of said vehicle, a flexible track substantially the width and at least the length of said vehicle wound on said reel, releasable means for securing the inner end of said wound track to said reel, the outer end of said wound track depending from said reel forwardly of the front wheels of said vehicle, means tending to rotate said reel in a direction to unwind said track from said reel, such means being adapted to anchor the free end of the track to the ground as the reel unwinds, and releasable means controllable from a remote point for restraining such rotation of said reel.

ROBERT B. ROBECK.